United States Patent [19]

Tidman et al.

[11] 4,429,612
[45] Feb. 7, 1984

[54] METHOD AND APPARATUS FOR ACCELERATING A SOLID MASS

[75] Inventors: Derek A. Tidman, Silver Spring; Yeshayahu A. Goldstein, Potomac, both of Md.

[73] Assignee: GT - Devices, Alexandria, Va.

[21] Appl. No.: 49,557

[22] Filed: Jun. 18, 1979

[51] Int. Cl.³ .................... F41F 1/00; F41F 1/02; G21B 1/00
[52] U.S. Cl. .................................. 89/8; 124/3; 376/102; 376/125
[58] Field of Search ............... 89/8; 124/3; 73/12; 310/10, 12; 376/102, 125

[56] References Cited

U.S. PATENT DOCUMENTS

| | | | |
|---|---|---|---|
| 2,783,684 | 3/1957 | Yoler | 89/8 |
| 2,790,354 | 5/1957 | Yoler | 89/8 |
| 2,870,675 | 1/1959 | Salisbury | 89/8 |
| 3,148,587 | 9/1964 | Melhart | 89/8 |
| 3,273,553 | 9/1966 | Doyle | 124/3 |
| 3,335,637 | 8/1967 | Null et al. | 89/8 |
| 3,357,706 | 12/1967 | Boyd et al. | 89/8 |
| 3,431,816 | 3/1969 | Dale | 124/3 |
| 3,854,097 | 12/1974 | Fletcher et al. | 89/8 |
| 3,916,761 | 10/1975 | Fletcher et al. | 89/8 |
| 3,929,119 | 12/1975 | Flecther et al. | 89/8 |
| 3,936,816 | 2/1976 | Espy | 89/8 |

FOREIGN PATENT DOCUMENTS

| | | | |
|---|---|---|---|
| 1903959 | 8/1970 | Fed. Rep. of Germany | 89/8 |
| 1033565 | 7/1953 | France | 89/8 |
| 448496 | 1/1936 | United Kingdom | 89/8 |

*Primary Examiner*—Sal Cangialosi
*Attorney, Agent, or Firm*—Lowe, King, Price & Becker

[57] ABSTRACT

An axi-symmetrical projectile, having a mass ranging from fractions of a gram to kilograms, is accelerated to velocities in the range of $10^5$ to $10^7$ centimeters per second by a propelling force produced by a plasma resulting from electric discharge. The discharge is imploded against the projectile surface so lines of the magnetic fields are approximately azimuthal around the projectile axis. The projectile is tapered so it experiences a net, stable axial accelerating force along the accelerator axis by the combined action of the magnetic field producing radially directed momentum and pressure on the plasma, the interaction of the magnetic field and ions induced by the plasma on the surface, as well as material the plasma ablates from the surface. The plasma discharge is initiated either in low density background gas between anode and cathode of a discharge module, or along an insulator surface between the electrodes in low density background gas. Alternatively, in either of these situations the discharge can be initiated in a gas which is produced by ablation of the projectile surface. In an alternative situation, the projectile acts as a switch for triggering discharges. Eddy current heating of the projectile is minimized by shaping the discharge current pulse so the plasma has a relatively weak magnetic field when it arrives at the surface, or by making the projectile electrically non-conducting. To provide a long acceleration path, a series of modules is aligned. In one embodiment, the projectile position, as it advances between modules, is sensed and discharges are switched on sequentially in the modules.

84 Claims, 7 Drawing Figures

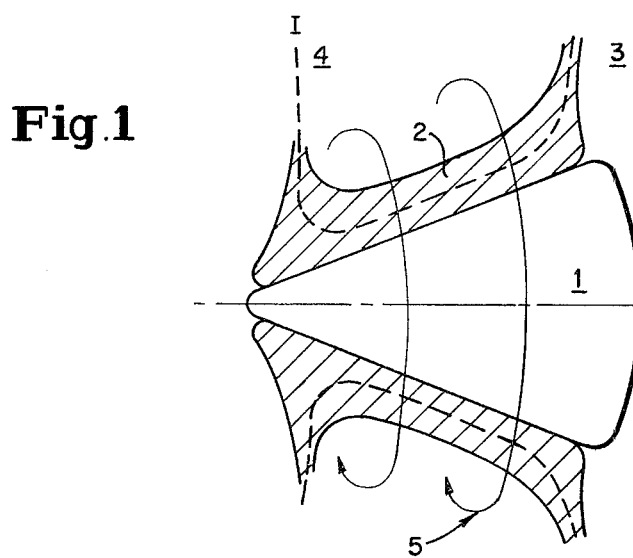
Fig.1
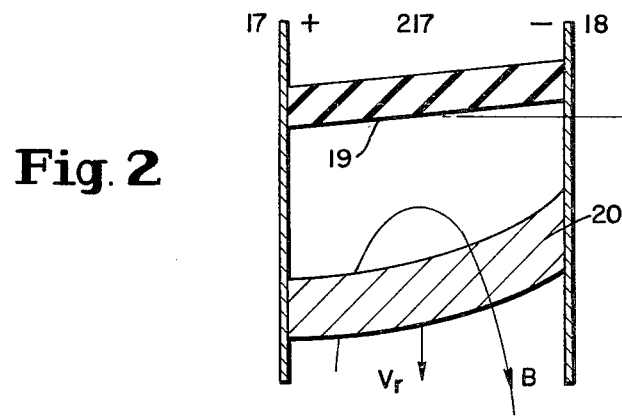
Fig.2
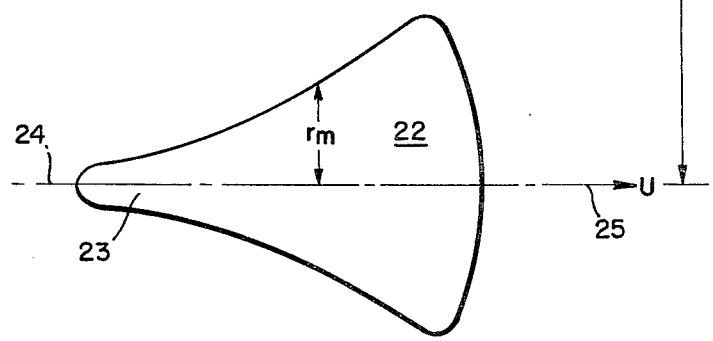
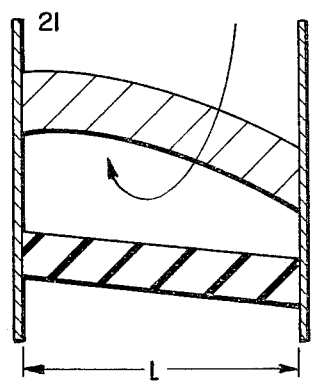

METHOD AND APPARATUS FOR ACCELERATING A SOLID MASS

TECHNICAL FIELD

The present invention relates generally to a method of and apparatus for accelerating a solid mass along a predetermined path, and more particularly to such a method and apparatus wherein a plasma discharge is imploded toward the mass, so the plasma arrives on a surface of the mass to impart force components to the mass along and normal to the path.

BACKGROUND ART

Previously, masses have been electromagnetically accelerated to relatively high velocities by devices known as rail guns. In rail gun devices, a single continuing voltage pulse is applied between a pair of parallel guide rails along which the mass is accelerated. The pulse causes a current to flow across a rear surface diameter of an electrically conducting, metal projectile which forms the mass. The projectile is guided and constrained by the rails along which it traverses. Frictional forces between the projectile and the rails materially limit the attainable projectile velocity and frequently result in the effective destruction of the rails or projectile. However, without the rail constraint, the projectile motion is unstable and unpredictable as is the projectile flight.

Accelerating small metal projectiles in strong travelling wave magnetic field devices has been suggested. However, the magnetic field induces considerable eddy currents in the metal projectile, frequently causing overheating of the projectile, which in turn results in melting of the projectile. Hence, if accelerating fields required to achieve high projectile velocity are employed, the projectile has a tendency to be destroyed by its accelerating forces. There have also been suggestions that superconducting projectiles could be accelerated in various magnetic field geometries. However, it is unlikely that such projectiles would remain in the superconducting state if subjected to the magnetic fields required to propel the projectile to a high velocity.

It is, accordingly, an object of the present invention to provide a new and improved method of and apparatus for accelerating a solid mass to very high velocities by electromagnetically derived forces.

Another object of the invention is to provide a new and improved method of and apparatus for accelerating a solid mass to a very high velocity by the use of electromagnetically derived forces that guide the mass, and avoid the need for constraining rails.

Another object of the invention is to provide a new and improved method of and apparatus for accelerating a solid mass along a predetermined path wherein force fields resulting from the electromagnetic source do not tend to have a destructive effect on the mass.

Another object of the present invention is to provide a new and improved electromagnetic method of and apparatus for accelerating a solid mass along a predetermined path at high velocity in such a manner that eddy current overheating of the mass does not occur.

Still another object of the invention is to provide a new and improved electromagnetic method of and apparatus for accelerating a mass stably along a predetermined path wherein the mass is approximately at room temperature or in some cases lower than room temperature but above cyrogenic temperatures as it enters an accelerating field.

DISCLOSURE OF INVENTION

In accordance with the present invention, a solid mass, preferably a projectile, is accelerated along a predetermined path by passing an electric discharge through a plasma layer adjacent the projectile surface layer. The discharge plasma is imploded against the projectile surface layer so the plasma arrives on a region of the peripheral surface to impart force components to the mass along and normal to the path, to thereby accelerate the mass along the path. To achieve stable acceleration along the path, the plasma arrives at the region on opposite sides of the surface with substantially equal forces so the normal components are balanced and the mass is accelerated by the axial components. In the preferred configuration, the region against which the forces act is a surface of revolution about a longitudinal axis of the mass and the plasma has a circular inner imploding periphery at right angles to the axis when it arrives at the region. In the preferred embodiment, to enable the axial force component to be derived, the interaction region is tapered toward the longitudinal axis in a direction opposite from the direction of acceleration and the plasma implodes toward the path.

Three mechanisms are involved in accelerating the mass to very high velocities, in the range of about $10^5$ to $10^7$ centimeters per second, velocities considerably in excess of those readily achievable by electromagnetic rail guns or chemical explosive driver techniques. In one mechanism an azimuthal magnetic field derived from current in the plasma compresses the plasma against the interaction region to impart momentum and pressure to the region, causing the mass to be accelerated along the path. Another mechanism occurs in response to the plasma inducing an ionized liquid layer in abuttment with the inner action region. The magnetic field associated with the plasma interacts with the ionized liquid to further accelerate the mass along the path. In accordance with the third mechanism, the plasma interacts with the region to ablate material from the region in a direction generally normal to the region to impart a force generally in the direction of the path. It is believed that all of these mechanisms occur to some degree, but that certain of the mechanisms are more dominant than others, depending upon the manner in which the plasma discharge is initiated.

To accelerate the projectile to velocities in the range of about $10^5$ to $10^7$ centimeters per second, the mass must interact with the imploding plasma over a relatively long distance, such as below one meter to several hundreds of meters, or even greater distances if higher velocities are desired. To this end, implosion of the plasma is synchronized with the acceleration of the mass along the path so the arrival of the plasma on the region is matched with movement of the projectile or mass axis along the path. Preferably, the synchronism is obtained by initiating separate plasma discharges at spaced regions along the path. In one embodiment the discharges are timed so that they occur at the spaced regions downstream of the mass prior to the mass arriving at the regions. Preferably, the separate discharges are initiated in response to a position detector for the projectile along the path. It is to be understood, however, that the separate plasma discharges could be initiated in response to a preprogrammed source that very accurately predicts the position of the projectile along the path. In another embodiment, the discharges occur in response to ionized plasma in an upstream section being swept into the abutting downstream section by the projectile.

The present invention is able to achieve mass velocities in the range of about $10^5$ to $10^7$ centimeters per second while avoiding eddy current overheating of the mass because the projectile can be formed as a dielectric. Alternatively, the mass can include metal, while avoiding the overheating problem due to eddy currents, by shaping the discharge current pulse applied to the plasma, so the plasma has a relatively weak magnetic field when it arrives at the surface. It appears that limitations of the accelerating force which can be applied to the projectile are concerned with the requirement that the projectile should not undergo excessive damage, such as crushing or spalling, in response to the strong accelerating forces.

The mass accelerator of the present invention is useful as a device for firing projectiles into space from the surface of the earth at velocities in the range of $1.5 \times 10^6$–$4 \times 10^6$ centimeters per second. The device can be carried in space craft in earth orbit to fire projectiles into outer space at lower velocities. The device can be used for injecting projectiles of radioactive waste or small probes into outer space. Alternatively, the device can be used as a means for rapidly activating electrical switches, by opening or closing them, or as a means for producing transient high pressure or high energy inpact conditions for various material response industrial applications.

In the preferred embodiment, high power, stable mass acceleration is achieved while minimizing the problem of mass or projectile overheating due to eddy currents while also avoiding frictional effects due to contact between the projectile and other solid surfaces, such as guide rails. In the preferred embodiment, these results are achieved, in part, by using a plurality of cascaded accelerating sections positioned along the length of the path. The sections are positioned in an envelope containing a gas and each section includes anode and cathode electrodes which form a discharge module for discharge plasma through the gas. Each discharge module provides an imploded current discharge through a gas layer near the projectile surface. The anode and cathode electrodes of each module are longitudinally spaced along, but remain remote from, the path. A solid dielectric remote from and surrounding the path extends between the electrodes. A high voltage source connected to the electrodes causes current to flow from the anode, through plasma situated at a radius outside of the projectile path, to the cathode. The self-magnetic field of the discharge, which is azimuthal relative to the acceleration direction of the projectile, drives the plasma layer radially inward against the projectile surface, to propel the projectile. The electrode arrangement causes maximum pressure and accelerating forces to occur at the projectile in the center of the electrode arrangement, rather than at a support arrangement for the electrodes.

To enable the projectile to be accelerated in a direction at right angles to the direction of the imploding plasma, the projectile has a conical or other type of tapered peripheral shape, with the taper extending in a direction opposite from the direction of acceleration. Thereby, an axial force component is imparted to the projectile by the imploding radial plasma, to accelerate the projectile along the path. The radially directed force components against the projectile from the imploding plasma stabilize the projectile on the path. Stability of the projectile is also enhanced by arranging the projectile so that the center of mass thereof is behind the average center of action of the force components on the projectile.

To achieve a relatively long accelerating region, one embodiment of the invention includes a plurality of cascaded discharge modules placed end to end. As the projectile passes through a given module, a high voltage pulse is switched across the electrodes of a downstream module, to initiate a propelling discharge in the downstream module. The discharge causes the plasma to be radially imploded so that the plasma arrives on the projectile surface as the projectile passes through the downstream module. This series of driving discharges is maintained by switching on the discharge modules in sequence, and with the correct timing as the projectile advances through the accelerator.

As an example of the approximate scaling involved in an accelerator device including a plurality of such discharge modules, assume that the projectile has a mass of M grams and is accelerated to a velocity of U centimeters per second with an average acceleration of g centimeters per second squared. The average total power in the electrical energy pulse that is required to attain acceleration of g centimeters per second squared is thus $$P = nP_{mod} = 10^{-7} MUg/\Sigma \text{ watts}$$

where $\Sigma$ is the efficiency with which electrical energy is transferred from an electrical storage system to projectile kinetic energy, P is the total power, $P_{mod}$ is the power of each module, and n is the average number of discharge modules that are operating at any one time, i.e., the average number of discharge modules having plasmas in any implosion stage to impact with the projectile surface as the projectile passes through the modules. If an accelerator has a total length L, L is related to the final projectile velocity (U), i.e., the projectile velocity as it leaves the accelerator, by $L = U^2/2g$. The accelerator therefore imparts a total kinetic energy to the projectile of:

$$W = 5.10^4 M(U/10^6)^2 \text{ Joules.}$$

For example, assuming $g = 5.10^8$ cm/sec$^2$, $\Sigma = 10^{-1}$, $V = 3.10^6$ cm/sec, yields a final maximum power P of $1.5 \times 10^9 \times M$ watts, and a projectile energy of $1.5 \times 10^5 \times M$ Joules imparted to the projectile over an accelerated length of 100 meters. Obviously, a wide range of accelerator dimensions can be incorporated depending upon the projectile mass, desired acceleration, and the application for which the device is built. In the above example, the relatively low value of efficiency of $10^{-1}$ (10%), has been assumed. However, an increase of efficiency to higher than 10% may become possible for the transfer of electrically stored energy to projectile kinetic energy.

The projectiles utilized in the present invention can be constructed out of various materials, either dielectrics or metals. For high current discharges, which produce high intensity magnetic fields in the vicinity of the projectile, it is important to eliminate or minimize eddy currents in outer layers of the projectile. Eddy currents in the outer layers of the projectile must be minimized to prevent heating within the projectile, which heating can be so severe as to cause premature melting of the projectile before a high velocity is reached. If it is necessary for the projectile to have metal parts in proximity to the surface thereof, the plasma pressure on the projectile can be derived mainly from the implosion momentum of the discharge so that the driving current can be reduced just before impact with the projectile surface. To this end, the voltage applied to spaced electrodes along the projectile path is reduced to a relatively low value, or to zero, or is reversed when the plasma had propagated to a region adjacent the projectile surface; such a result can be achieved with an exponentially damped or over damped voltage source, such as a transmission line connected to a high voltage source. Alternatively, eddy current heating can be completely avoided by constructing the projectile of a dielectic, in which case electric current is able to flow only through the surface plasma layer pinched against the projectile. If the electric current from the magnetic field flows only through the surface plasma layer pinched against the projectile, Joule dissipation is zero inside the projectile, except at the thin-conducting skin layer that is converted to plasma at the outer edge of the projectile. The converted plasma layer advances into the projectile relatively slowly via thermal conduction and ablation during acceleration. In other words, the plasma layer advances more slowly than would be the case for the more deeply penetrating skin current layer that occurs for metal projectiles.

The plasma discharge adjacent to the projectile surface can be initiated in several ways. In one configuration the discharge can be initiated in low density background gas between an anode and cathode, adjacent a solid dielectric close to or aligned with tips of the electrodes proximate the projectile. In another arrangement, low density gas along the surface of a dielectric between the anode and cathode electrodes is ionized by a discharge between the electrodes, adjacent a solid dielectric remote from tips of the electrodes proximate the projectile. The ionized discharge is imploded radially inward against the projectile surface in response to the magnetic field induced in the gas as a plasma.

Alternatively, for some projectile materials, sufficient gas can be continuously ablated from the projectile surface as the projectile advances between adjacent modules containing anode and cathode electrodes. In such a situation, entry of the projectile into a gap between the anode and cathode electrodes of a particular module increases gas pressure between the electrodes. The increased pressure reduces the impedance between the module electrodes to enable substantial current to flow between the electrodes so the projectile effectively activates a switch that triggers the discharge. A gas puff is injected into the first module to initiate the sequence of discharges in synchronism with movement of the projectile through the modules. A plurality of sharpened needle electron emitters can be distributed azimuthally around the inner cathode edge to insure an azimuthally uniform discharge.

To establish the sequence of discharges in a mass accelerator in accordance with the present invention, standard, state of the art of high voltage and switching technology is employed. For example, a capacitor or inductive energy storage device could be utilized as could pulse-forming transmission lines. To sense the position of the projectile as it is accelerated along the path, each module can include a light beam which is interrupted as the projectile is suitably positioned in the module between the electrodes, to control activation of pulses in the modules.

Various projectile shapes can be utilized to assure that a forward accelerating force is applied to it in response to a radially directed imploding plasma discharge. The projectile shape is designed so that there is a stable progression of the projectile as it advances between modules of the accelerator. To assist in stabilizing the projectile, the projectile includes a tail section having a relatively small curvature to insure that a pinched discharge is provided with a hard core, so that kink instability, as described on page 4-208 of *Handbook of Physics,* Second Edition, edited by E. U. Condon et al, 1967, McGraw-Hill Inc., does not occur as a main tapered section having greater curvature advances between electrodes of adjacent modules.

With the apparatus and method of the present invention, projectile having masses ranging from fractions of a gram to kilograms can be accelerated to velocities in the range of approximately $10^5$ centimeters per second to $10^7$ centimeters per second without melting the whole projectile. Maximum propelling force densities occur adjacent the projectile surface and not at the surrounding electrode structures, and stable acceleration is obtained without the use of guide rails because of the balanced forces radially applied to the projectile.

The invention can be utilized to provide rapid switching in electrical circuits by accelerating a projectile to a velocity in the range of $10^6$ centimeters per second to $3 \times 10^6$ centimeters per second. For such an application, an electrically conducting projectile, having a metallic skin, is fired into a gap between a pair of adjacent electrical conductors, having a spacing less than the projectile length. The metallic skin of the projectile closes a circuit between the two conductors, or it could rapidly remove a conducting section of a circuit by impact of the projectile with the electrically conducting sections.

The invention can also be utilized for disposal of radioactive waste or for launching of space probes by accelerating projectiles to velocities in the range of $1.5 \times 10^6$ to $4 \times 10^6$ centimeters per second. Such projectiles would have a mass in the range of 0.1 to 1 kilogram. For such an application, the principles of the invention would be combined with atmospheric hole-boring techniques, to enable the projectiles to be fired directly into space from the surface of the earth, or lower velocities could be utilized to fire the projectiles into space from earth orbit.

The invention can also be utilized to produce extremely high pressure and high energy density transient conditions in materials which are impacted by a projectile. Such high pressure and high density transient conditions in target mass materials can be utilized for various industrial applications.

It is, accordingly, an additional object of the present invention to provide a new and improved apparatus for and method of electromagnetically accelerating projectiles to velocities sufficient to enable the projectiles to be launched into space from the surface of the earth or from earth orbit.

Still another object of the invention is to provide a new and improved apparatus for and method of accelerating a projectile to a velocity range of $10^6 - 5 \times 10^6$ centimeters per second, to provide rapid switching in electrical circuits.

A further object of the invention is to provide a new and improved apparatus for and method of producing extremely high pressure and high energy density transient conditions in materials in response to an electromagnetically accelerated projectile.

Yet another object of the invention is to provide a new and improved projectile that is configured to enable it to be adapted for stable acceleration along a predetermined path in response to electromagnetically derived forces.

The above and still further objects, features and advantages of the present invention will become apparent upon consideration of the following detailed description of one specific embodiment thereof, especially when taken in conjunction with the accompanying drawings.

BRIEF DESCRIPTION OF THE DRAWINGS

FIG. 1 is a cross-sectional diagram of one embodiment of a projectile with a high current discharge plasma thrust radially inward by a magnetic field derived by the current in the plasma, which plasma produces forces against the projectile surface;

FIG. 2 is a cross sectional illustration of a single discharge module in accordance with the present invention wherein a modified projectile shape is illustrated and the discharge plasma is imploding radially inward toward the projectile surface from an origin in low density gas adjacent an insulator separating anode and cathode electrodes;

DETAILED DESCRIPTION OF THE DRAWINGS

Figure 3:
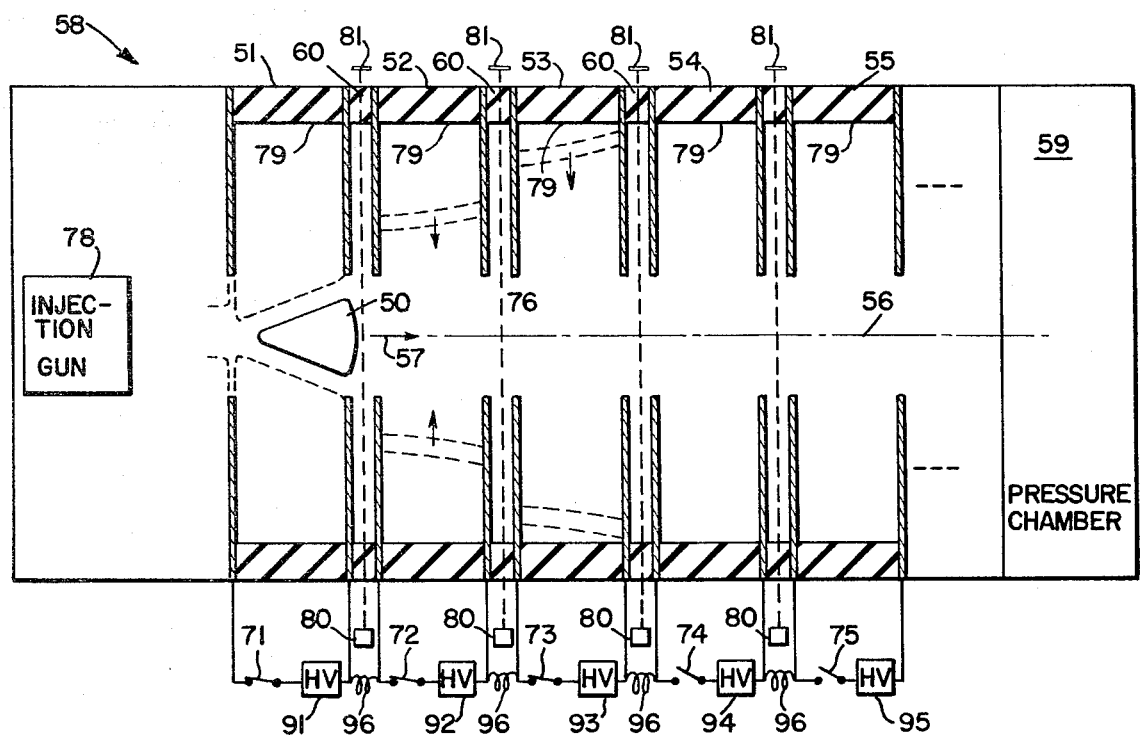
FIG. 3 is an illustration of a series of cascaded anode-cathode modules, placed end to end, and triggered in sequence by the interruption of light beam sensors so that the projectile continuously is subjected to propelling imploded discharges as it accelerates along a common longitudinal axis of the modules.

Reference is now made to FIG. 1 of the drawings wherein there is illustrated a tapered projectile 1, formed as a cone symmetrical about longitudinal axis 6. The peripheral surface of projectile 1 is thus a surface of revolution of a straight line intersecting axis 6 and has a taper toward the axis in a direction opposite from the direction of motion of the projectile, as indicated by arrow 7. The surface of revolution is terminated at the tail of projectile 1, slightly in front of the tail, so that the tail has a smooth, curved configuration that is tangent with the surface of revolution. Projectile 1 has a nose that is slightly convex in the direction of arrow 7, relative to the surface of revolution. A plasma discharge 2 abuts against the surface of revolution region of projectile 1 to impart force components to the projectile normal to axis 6, as well as along the axis. Projectile 1 responds to the force components of plasma discharge 2 so that the projectile is stably accelerated in free flight along a path which is coincident with axis 6 and arrow 7. Plasma discharge 2 establishes equal but opposite forces on projectile 1 normal to axis 6 because the cross section of the plasma discharge, at right angles to the sheet of FIG. 1, is an annulus having its inner periphery in contact with the surface of revolution region of the projectile.

In FIG. 1, it is assumed that projectile 1 has a forward velocity along axis 6, in the direction of arrow 7, at the time plasma discharge 2 engages the projectile region formed as the surface of revolution. Thus, plasma discharge 2 is timed so that it has either arrived at the illustrated position, against the projectile region from some radial distance through which the plasma discharge has been imploded, or it is timed to be initiated in gas or ablated projectile material already adjacent the projectile interaction region. The plasma results from a discharge current 4 that flows through the gas (e.g., at an initial pressure of 1 Torr) generally longitudinally of axis 6 and parallel to the interaction region of projectile 1 with plasma 2. The longitudinal flow of current 4 through plasma 2 produces an azimuthal magnetic field flux 5 that is coaxial with axis 6 and surrounds the tapered interaction region of projectile 1. Azimuthal magnetic field flux 5 implodes plasma 2 inwardly, toward axis 6, so that the configuration of plasma 2 is essentially that of a tapered Z-pinch discharge which is thrust inward against the tapered projectile surface by the magnetic field forces of the plasma. Thus, the imploding plasma has substantial velocity components toward the flight path of projectile 1 and insubstantial velocity components in the direction of the path. While the current is shown in FIG. 1 as flowing through plasma discharge 2 from the tail of projectile 1 to the nose of the projectile, it is to be understood that the current direction could be reversed.

The force components applied to the interaction region of projectile 1 result from the combined effects of the momentum of the imploded plasma, thermal and magnetic field pressures, together with the reaction forces produced at the interaction region by ablation of projectile material that occurs at the interaction region due to the inward transport of energy via thermal conduction, radiation and Joule dissipation. The magnetic field pressure results from an interaction between the azimuthal magnetic field flux 5 and a current produced at the interaction region in response to ionization of gas at the projectile surface by the plasma. The net result of these effects is to accelerate projectile 1 forward, to the right in FIG. 1 in the direction of arrow 7, and thereby increase the projectile velocity. The relative importance of the various effects varies depending upon parameters such as the current initially applied to the plasma, the radius where the plasma is initiated and in what gas density the plasma is initiated.

The discharge can be initiated in various ways. One method for initiating the plasma is to provide a current through a low density background gas between anode and cathode electrodes spaced along the path of projectile 1. Alternatively, the discharge can be initiated along the surface of an insulator between the anode and cathode electrodes in a background gas. An additional method for initiating the discharge is by ablation of material from the interaction region of projectile 1, so that the discharge moves with the projectile. In the latter case, the projectile can act as a switch to initiate the discharge at successive locations along path 7. The basic configuration of the projectile is the same, regardless of the manner in which the discharge is initiated. The different mechanisms are established as a function of the manner in which the plasma discharge is initiated. The mechanisms which interact to propel projectile 1 are also dependent upon over what time scale momentum or pressure are built up in discharge plasma 2 which propels projectile 1. As described infra in connection with FIGS. 3 and 4, a preferred arrangement for establishing the plasma discharge is to initiate a breakdown voltage in a background gas along the surface of an insulator as an annular plasma region of radius larger than the projectile radius. Such a discharge is imploded inwardly toward path 7 against the interaction region of projectile 1 by magnetic field 5.

Reference is now made to FIG. 2, a cross sectional diagram of one embodiment of a Z-pinch diode discharge module. Such a diode discharge module is a basic component of a mass accelerator in accordance with the invention. In FIG. 2 is also illustrated a projectile 22 that is accelerated by and through the Z-pinch diode discharge module. The module of FIG. 2 includes annular anode and cathode electrodes 17 and 18, which are concentric with axis 24 of projectile 22 which is substantially coincident with path 25 of the projectile. Electrodes 17 and 18 are spaced from each other along path 25 and are mutually insulated. Discharge current flows through a relatively low pressure gas, such as air, in the gap between electrodes 17 and 18 in response to the application of a relatively high voltage pulse between the electrodes. The current flows from anode 17 to cathode 18, but it is to be understood that the position of the anode and cathode could be reversed, in which case the current would flow in the opposite direction. While electrodes 17 and 18 are preferably annular discs, with an aperture at the center thereof with sufficient radius to allow passage of projectile 22, it is to be understood that the electrodes may be broken up into azimuthal segments around acceleration axis, i.e., path 25, or deformed into a conical or other shapes without altering the basic principles of the invention. In any event, it is necessary for the spacing between electrodes 17 and 18 to be not greater than the length of the projectile passing between the electrodes to assure efficient acceleration of the projectile through the module.

At a suitable time interval before arrival of projectile 22, from the left in FIG. 2, in the gap between electrodes 17 and 18, a high voltage pulse is switched on between the electrodes. The high voltage pulse is sufficient to initiate a discharge in a low density gas along the inner surface of dielectric ring 19, which is concentric with path 25. Ring 19 is tapered outwardly from axis 25, with the direction of outward taper being in the direction of motion of projectile 22. The high voltage pulse causes a relatively high current, annular discharge 20 to be driven radially inward toward axis 25, away from the interior surface of dielectric ring 19 where it is initiated. Plasma 20 accelerates towards path 25 in response to the magnetic field, B, associated with the plasma. Magnetic field B is a torroid concentric with path 25 and extends in the azimuthal direction relative to the axis. As discharge 20 advances radially inward toward path 25, it accumulates more plasma by sweeping up additional background gas by the well known snow plow effect associated with Z-pinching. The gas pressure of the background gas, typically air, in region 21 between insulator 19 and path 25 is on the order of one torr but may be any suitable value depending on the desired momentum of pulse at the interaction region of projectile 22. By tapering insulator 19 between electrodes 17 and 18, imploding annular plasma 20 is initially tapered. Plasma discharge 20 becomes more tapered as it implodes toward axis 25, so that the plasma matches the interaction region of projectile 22. While such tapering of electrode 19 and plasma discharge 20 are desirable, it is not essential and the insulator could be a simple, straight cylindrical section separating electrodes 17 and 18. The discharge between electrodes 17 and 18 is timed by standard electrical means which sense the position and velocity of projectile 22 upstream of module 217 so that when projectile 22 arrives at a position where its nose is approximately aligned with cathode 18, the imploding discharge collides with the interaction region of the projectile and propels the projectile forward.

Projectile 22, as illustrated in FIG. 2, has a slightly extended tail section 23. Tail section 23 has a curvature less than the curvature of the main portion of projectile 22, adjacent the projectile nose. By extending tail section 23, the center of mass of projectile 22 is positioned behind the center of action of the accelerating force on projectile 22, to assist in providing stable acceleration to the projectile. The center of mass of projectile 22 could also be established behind the center of action of the accelerating force on the projectile by providing the projectile with a hollow cavity adjacent the nose portion of the projectile. Extended tail section 23, however, has an additional advantage of providing a solid core so that as projectile 22 advances out of the discharge region between electrodes 17 and 18, to the right in FIG. 2, the pinched discharge region of plasma against the tapered tail 23 of the projectile is not free to thrash about. Because the pinched discharge region does not thrash about, the well known plasma kink stability phenomena does not occur. The plasma kink stability phenomena is to be avoided because it is likely to produce destabilizing forces on projectile 22. It is to be understood that a number of different projectile shapes could be used without departing from the basic principles of the invention. In the preferred embodiment, wherein a radially directed plasma interacts with the projectile, the projectile is tapered as illustrated.

To provide the desired acceleration, the implosion velocity of annular discharge plasma 20 as it approaches the interaction region of projectile 22 must be at least approximately twice as large as the velocity of the projectile along path 25. By imploding plasma discharge 20 at such speeds, the timing between the discharge and projectile 22 can be arranged so that no contact exists between plasma discharge 20 and any part of projectile 22 prior to arrival of the projectile in the gap between electrodes 17 and 18. Further, plasma discharge must be timed to collide with the interaction region of projectile 22 before the projectile has had time to move ahead, outside of the gap of electrodes 17 and 18, i.e., to the right of electrode 18 in FIG. 2.

In the discharge module illustrated in FIG. 2, the implosion time for annular plasma discharge 20 to move radially from insulator surface 19 to the interaction region of projectile 22 can be greater than the transit time of the projectile across the gap between electrodes 17 and 18. Such a result can occur depending upon the choices of parameters for the density of the gas in the region between path 25 and the inner diameter of ring 19 and between electrodes 17 and 18 (determined by the evacuation pressure of this region) and the voltage applied between the electrodes. In other words, the implosion time of plasma discharge 20, $t_{impl}$, can be larger than the projectile transit time between electrodes 17 and 18, L/U, where L is the gap between electrodes 17 and 18, and U is the velocity of projectile 22 along path 25. The implosion time can be calculated as:

$$t_{impl} = \int_{r_m}^{R} \frac{dr}{V_r(r)},$$

where r is a radial position from path 25, $V_r(r)$ is the inwardly directed radial velocity of annular discharge 20 as a function radial position r, R is the mid point radius of insulator surface 19 from path 25, and $r_m$ is the radius of projectile 22 at a distance half way behind the point where the nose of projectile 22 intersects axis 25. If the implosion time is greater than the transit time, a power multiplication can be obtained. The power multiplication occurs because the driving voltage and current applied by electrodes 17 and 18 to the gas accumulate implosion momentum for a longer time than the characteristic projectile encounter time with the plasma (L/U). Of course, the projectile can respond to the accumulated momentum in the plasma only during the encounter time. During the final stages of the implosion of plasma 20 against projectile 22, the discharge current in the plasma can be reduced so that when the plasma impacts with projectile 22, eddy current heating of metal parts in the projectile is reduced. It is also important for the gas density in which the discharge is initiated to be sufficiently low to enable the final implosion velocity of plasma discharge 20 to exceed the velocity of projectile 22 along path 25. It is also important, at the same time, for the implosion radius of plasma discharge 20 to be sufficiently large to provide a discharge momentum at a high surface pressure on impact with the projectile.

A source of voltage pulses, V (t), (not shown) is connected between electrodes 17 and 18. Initially, the voltage pulse establishes a discharge between electrodes 17 and 18 along the inner edge of dielectric ring 19. As time progresses and the voltage is maintained across electrodes 17 and 18, the discharge implodes inwardly towards path 25. Current flowing in the discharge causes the azimuthal magnetic B field to be established in and at a greater radius than the discharge. The magnetic B field forces the discharge inwardly. As the discharge propagates toward path 25, it has accumulated gas from the region having a diameter greater than the discharge to increase the mass of gas in the discharge. The voltage pulse source can include standard components and can be derived from conventional capacitive or inductive energy storage devices. Pulses from the source can be supplied to electrodes 17 and 18 by transmission lines and suitably triggered switches. The current, I, which flows through the discharge between electrodes 17 and 18 is determined by the circuit equation:

$$V = d/dt(LI) + IR,$$

where L and R are the total inductance and resistance of the source and circuit connecting the source and electrodes together, as well as the impedance between electrodes 17 and 18. Hence, $L = L_p + L_g$ and $R = R_p + R_g$, where $L_p$ and $R_p$ are respectively the inductance and resistance of the system containing electrodes 17 and 18, plasma discharge 20, and projectile 22, and $L_g$ and $R_g$ are the inductance and resistance of the pulse source and connection system between the pulse source and electrodes 17 and 18. Determination of the contribution of discharge 20 to the values of $L_p$ and $R_p$ involves solving hydrodynamic equations for magnetically imploded plasma shells, or alternatively solving equations for simpler dynamic models for such plasma discharges. This is a well studied subject for which there is extensive literature. The literature has been pursued for applications relating to the so-called plasma focus device and to dynamically imploded gas puffs or annular foils which have been imploded in high power diode devices to create impulsive radiation sources.

For example, consider a system having a circuit rise time, L/R, longer than the duration of a pulse derived from the pulse source. In this example, it is assumed that the discharge inductance $L_p$ is nearly equal to the generator inductance, $L_g$, so that the circuit current rises approximately linearly as I = Vt/L for an applied square wave voltage pulse. For a discharge implosion of approximately 15 microseconds and a total inductance L of 30 nanohenries, a voltage of 2 kilovolts between electrodes 17 and 18 provides a final current of approximately $10^6$ amperes. If the system has an overall efficiency of 10%, projectile 22 has an energy gain of approximately 1.5 kiloJoules in traversing the module between electrodes 17 and 18. Of course, this is merely an exemplary situation and the parameters could vary widely.

In FIG. 3 is illustrated an embodiment of a mass accelerator including a plurality of discharge modules 51-55 which are axially aligned and concentric with axis 56 which is traversed by projectile 50 so that axis 57 of the projectile is substantially coincident with axis 56. Modules 51-55 are located in a partially evacuated envelope 58, which contains a suitable gas. In one preferred embodiment, envelope 58 contains air at an atmosphere of 1 torr. To enable projectile 50, after it has been accelerated by the modules, to escape from envelope 58, the envelope includes a pressure chamber 59, of well known construction, to provide a transition from the pressure within envelope 58 to ambient, e.g., atmospheric, pressure outside of the envelope. In an alternative, a thin metal foil could be positioned at one end of envelope 58 to establish the pressure differential between the interior and exterior of envelope 58; in such an instance, the foil would be easily broken by projectile 50 after it has been accelerated by modules 51-55.

While only five modules are illustrated in FIG. 3, it is to be understood that there may be a large number of such modules, as indicated by the dotted lines to the right of module 55.

Each of the cascaded modules within envelope 58 is substantially the same, and is constructed similarly to the module described supra in connection with FIG. 2, so the inner diameter of the modules is larger than the maximum diameter of the projectile. Adjacent electrodes at adjacent modules are spaced from each other by solid dielectric rings 60 and are connected to each other by large conducting inductors 96 that prevent high current discharge from occuring on the surfaces of the insulators 60 even though the insulator lengths are relatively short in the direction of path 56. To this end, the value of inductors 96 is selected such that the inductors are virtually open circuits for the entire time while switches 71-75 are closed, typically ten to several hundred microseconds. Rings 60 are illustrated as having the same radial thickness as the dielectric rings 79 associated with modules 51–55 for ease of manufacture, but it is to be understood that rings 60 can have any thickness from a minimum at the inner periphery of dielectric envelope 58 to a maximum, which would be from the envelope to about the inner radius of the electrodes.

The electrodes of modules 51–55 are respectively connected by switches 71–75 to high voltage sources 91–95. The voltages of sources 91–95 are typically a few to several tens of kilovolts, depending upon the application of the invention, i.e., the mass of projectile 50 and the desired final speed of the projectile. Preferably, projectile 50 is injected into the first module 51 by a suitable means, such as injection gun 78. Injection gun 78 could be a source of chemical explosion to accelerate projectile 50 into module 51 or it could be a relatively low velocity rail gun. Alternatively, projectile 50 could be stationary in module 51 and supported by an axial rail that extends along a bore coincident with a portion of projectile axis 57.

As projectile 50 is propelled forward between the anode-cathode gaps of modules 51–55, the projectile position is sensed. Sensing of the projectile position can be accomplished by projecting a light beam 76 from source 80 between adjacent modules 51–55 through diametric bores (not shown) in dielectric rings 60. Beam 76 is projected radially toward axis 56 to mirror 81. Mirror 81 is mounted diametrically opposite light source 80 and normally directs light from the source back to a photodetector located within the source. In response to light beam 76 being interrupted, as occurs when the projectile is accelerated along path 56, the photodetector within source 80 derives a signal which is used to determine when to trigger a downstream one of modules 51–55. To this end, signals from sources 80 are applied to a suitable computer (not shown) which supplies control signals to switches 71–75 to apply high voltage pulses to electrodes of the modules. The closure of switches 71–75 is timed so that the discharge of a particular module arrives on the interaction surface or region of projectile 50 when the projectile is appropriately positioned in the anode-cathode gap of the particular module for further acceleration. The switches are closed in sequence as projectile 50 advances along axis 56 of the accelerator.

In the embodiment illustrated in FIG. 3, the electrodes of adjacent modules are reversed in electrical polarity so that ionized gas on the surface of projectile 50, resulting from the plasma discharge, experiences alternatingly polarized magnetic fields and discharge currents. The alternating polarity is not an essential feature of the invention, although it may have high voltage module packing advantages because it enables the length of insulators 60 to be reduced and/or the size of inductors 96 to be reduced. It is to be understood that various polarity choices for the electrodes of modules 51–55 can be made consistent with the principles of the invention.

In the device, as illustrated in FIG. 3, switches 71, 72 and 73 are closed so that discharges are initiated in modules 51, 52 and 53. In the illustrated system, the plasma discharge of module 51 is interacting with the interaction region of projectile 50, to accelerate the projectile along axis 56. Simultaneously, the plasma of module 52 is farther removed from axis 56 than the plasma in module 51, and the plasma discharge in module 53 is even farther from axis 56. The plasma discharges of modules 51–53 are at differing radial positions relative to axis 56 because switches 71–73 are sequentially closed. To attain very high power compressions by the discharge plasma against projectile 50, each of the annular modules has a relatively large radius between axis 56 and dielectric ring 79 where the plasma discharge is initiated; for example the inner radius of ring 79 is typically 5 to 50 times the maximum radius of projectile 50. For such a situation, the discharge must be initiated several modules downstream of module 51 as projectile 50 moves through module 51.

Figure 4:
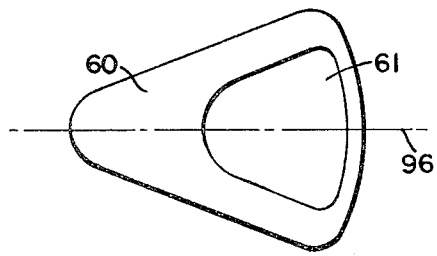
FIG. 4 is a cross sectional view of a projectile embodiment having a conical shape with a hollow nose region so that the center of projectile mass is behind the center of thrust applied to the projectile by forces resulting from the plasma discharge.

In FIG. 4 is illustrated details of a preferred embodiment of a projectile that could be utilized in connection with the present invention, and which forms a part of the invention. The projectile of FIG. 4 is a simple conical projectile having a longitudinal axis of symmetry 96 about which a straight line is rotated to form a peripheral surface of revolution. The surface of revolution is the region of the projectile against which the forces derived from the plasma are exerted. Behind the surface of revolution the projectile includes a curved tail that has a smooth transition between the surface of revolution and the curved portion of the tail. Forward of the surface of revolution, the projectile has a convex nose portion. Immediately behind the projectile nose portion the projectile includes a cavity 61 which causes the projectile to have a center of mass along axis 96, at a point relatively far from the projectile nose. The center of projectile mass is removed sufficiently far from the nose to be behind the center of action of the propelling forces to provide stable acceleration. Projectile 60 could be fabricated from metal, for situations in which the imploded plasma magnetic fields are relatively weak. Alternatively, projectile 60 could be fabricated of a dielectric, to avoid eddy current melt down of the projectile for situations in which the magnetic field of the plasma and currents flowing in the plasma are relatively large.

Figure 5:
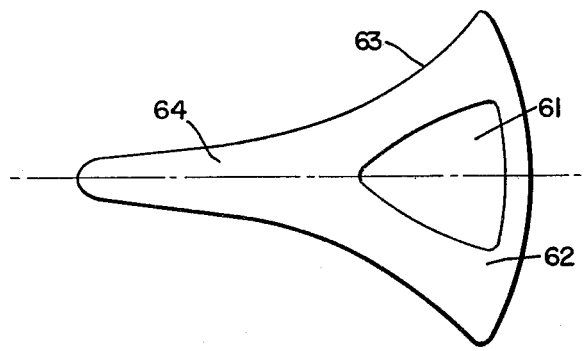
FIG. 5 is an illustration of another embodiment of a projectile wherein the projectile has a tapered cone width and elongated tail section and a hollow nose region to provide a center of mass behind the center of thrust.

In a second preferred projectile configuration, illustrated in FIG. 5, projectile 62 has a relatively high curvature proximate the convex nose thereof, and an elongated tail section 64, with a slight curvature. Tail section 64 is terminated by a rounded portion. The high and low curvature portions of projectile 62 are both formed as surfaces of revolution and can be the surface of revolution of a hyperbola or exponential function. The forward high curvature portion 63 of projectile 62 deflects the imploded plasma rearwardly in a more efficient manner than the relatively straight interaction region of projectile 60. The elongated, slightly curved tail section 64 of projectile 62 stabilizes kink instabilities in the pinched discharge plasma at the rear of the projectile. In addition, the elongated tail section assists in moving the center of mass rearwardly, so that the center of mass is behind the average interaction point between the projectile and the forces applied to projectile by the discharge plasma. Projectile 62 is also provided with a hollow portion 61, proximate its nose.

Figure 6:
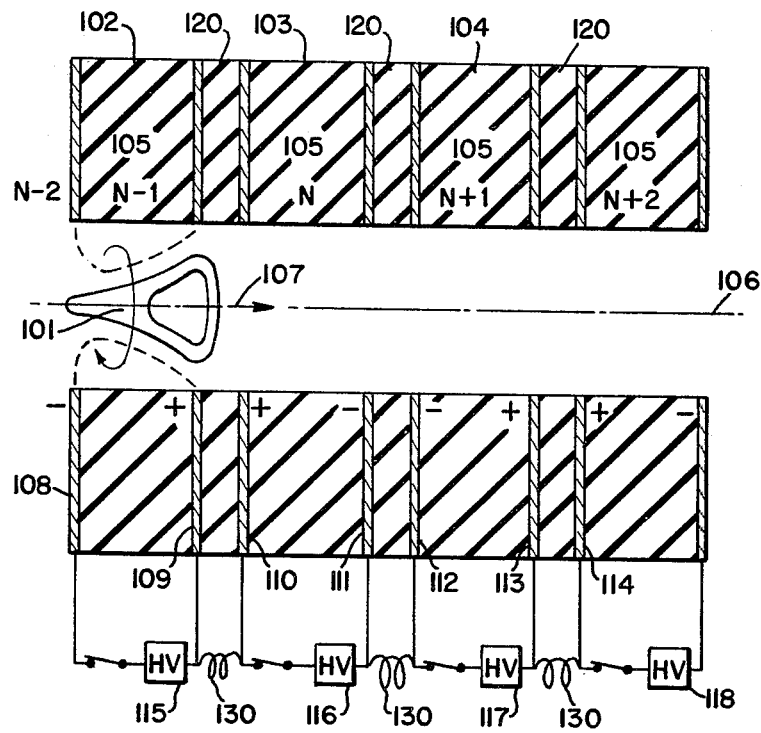
FIG. 6 is a diagram of another accelerator embodiment of the invention wherein successive modules are triggered in response to plasma propagating with the projectile.

Reference is now made to FIG. 6 of the drawing wherein there is illustrated a further embodiment of the invention wherein projectile 101 is accelerated by the same three forces as the projectile in the embodiment of FIG. 3. In the embodiment of FIG. 6, however, the magnetic pressure and ablation and Joule heating effects on the surface of projectile 101 are greater than the accelerating effects due to the imploding plasma, in contrast to the FIG. 3 embodiment. The FIG. 6 embodiment is not as advantageous as the FIG. 3 embodiment because excessive ablation may cause much of the projectile 101 to disintegrate as it is accelerated. However, the system of FIG. 6 does not require any sensing structure to trigger discharges in successive sections, as the gas from section (N−1) triggers the discharge in section N as the projectile advances from section (N−1) to section N.

The embodiment of FIG. 6 includes a series of cascaded sections, three of which (namely sections 102, 103 and 104 which can be respectively considered as sections (N−1), N and (N+1)) are illustrated. Sections 102, 103 and 104 are similar to each other, as each includes a dielectric ring 105 that is concentric with axis 106 of the accelerator and along which axis 107 of projectile 101 travels. Each of rings 105 extends between electrodes at opposite ends of each of the sections. Adjacent sections are separated by dielectric rings 120. Electrodes 108-114 are metal discs concentric with axis 106 and having the same inner radius as rings 105. DC voltages, indicated by voltage sources 115-118 are permanently established between adjacent pairs of the electrodes at the boundaries of adjacent sections so that there is an alternation of positive and negative fields established between the electrodes along the length of the accelerator. A large inductance 130 is connected between the electrodes of neighboring modules to prevent discharge currents from flowing between the electrodes of neighboring modules.

In particular, the negative and positive electrode sources 115 are respectively connected to cathode and anode 108 and 109, the positive and negative electrodes of DC source 116 are respectively connected to electrodes 110 and 111, and the negative and positive terminals of DC source 117 are respectively connected to electrodes 110 and 113.

Typically, in the embodiment of FIG. 6, the ratio between the radii of the inner diameter of the accelerator and of projectile 101, i.e., the radii of rings 105 and electrodes 108-114 is in the range of 1.1 to 3. In contrast, in the embodiment of FIG. 3, there is a much greater ratio between the radius of the projectile and the radius of insulator 79, but there is approximately the same ratio between the maximum radius of the projectile and the inner radius of the electrodes. Hence, in the embodiment of FIG. 6, the imploding discharge travels a much smaller radial distance than in the embodiment of FIG. 3 and has a much lower velocity when it impacts on the projectile surface than in the FIG. 3 embodiment. The shorter length and duration of the discharge in the FIG. 6 embodiment occurs because the magnetic field acts through a shorter distance and for a shorter time than in the FIG. 3 embodiment.

In the FIG. 6 embodiment, the region between the acceleration path 106 and the inner edge of rings 105 is evacuated to a low pressure of less than 0.01 torr so that prior to arrival of gas ablated from the projectile, discharge current does not flow in the downstream modules. Thus only when the projectile arrives in a given module with its ablated plasma does the discharge current start to flow. There is considerable Joule heating of the gases ablated from the tapered surface of projectile 101. As projectile 101 is accelerated between electrodes 108 and 109 it causes a current to flow from electrode 109 to electrode 108 once the projectile is wholly within section 102. The backward movement of plasma from the tapered surface of projectile 101, by ablation, and the propelling force due to current flowing in the ionized gas at the surface of the rearwardly tapered portion of the projectile primarily cause the projectile to be accelerated into section 103. In response to projectile 101 being accelerated completely into section 103, so that the tapered portion of the projectile is in the gap between electrodes 110 and 111, there is a discharge between the electrodes with further magnetic field and gas pressure together with ablation from the projectile surface. These two forces primarily combine to force projectile 101 into section 104. The process continues for many different sections, until projectile 101 has been accelerated through the entire accelerator and emerges through a vacuum-atmospheric interface, at the end of the accelerator.

Figure 7:
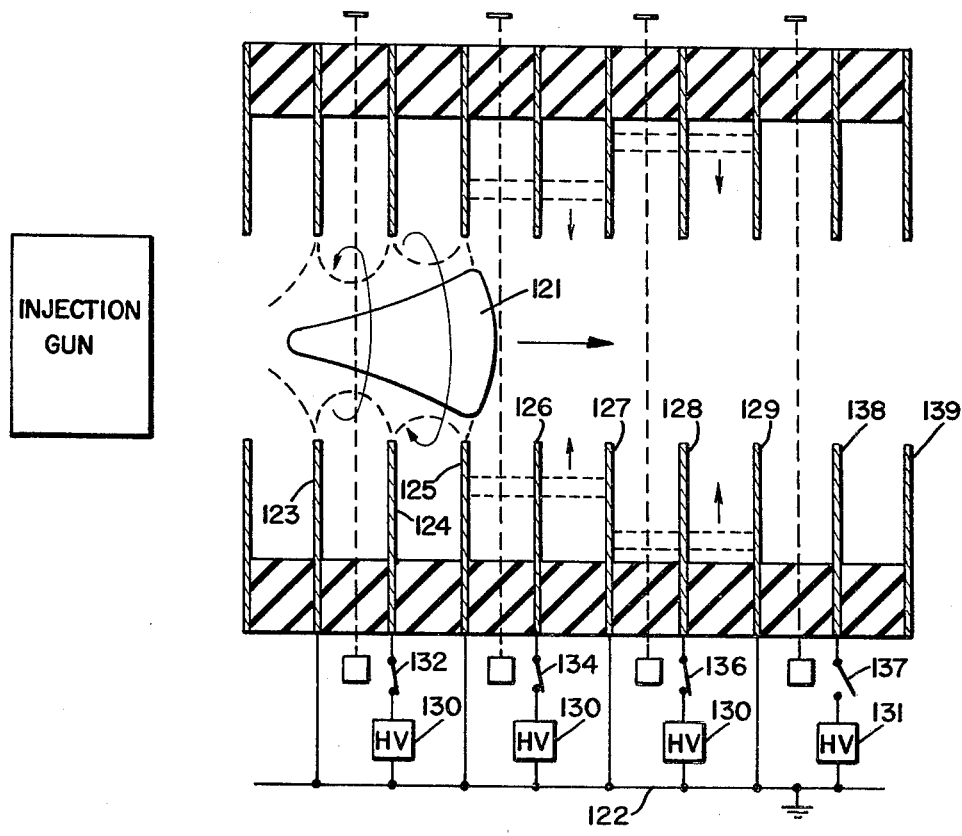
FIG. 7 is a diagram of a modification of the FIG. 3 apparatus.

Reference is made to FIG. 7 of the drawing wherein there is illustrated a modification of the embodiment of the invention illustrated in FIG. 3. In the modification of FIG. 7, there is closer packing between adjacent electrodes than in the embodiment of FIG. 3. In the FIG. 7 embodiment, the electrodes are polarized so that there is an alternation of the voltages applied to adjacent electrodes. In the FIG. 7 embodiment, projectile 121, however, must have a length at least equal to the separation between like polarized adjacent electrodes, i.e., the minimum projectile length=$2L_1$, where $L_1$ equals the separation between adjacent electrodes having unlike polarizations.

To these ends, alternate electrodes in the accelerator of FIG. 7 are connected to a reference potential, such as ground, by bus 122. Hence, cathode electrodes 123, 125, 127 and 129 are connected to bus 122. Anode electrodes 124, 126 and 128 are connected to high voltage terminals of power supplies 130 through switches 132, 134 and 136, respectively. Switches 132, 134 and 136 are connected to terminals of supplies 130 having like polarities, either positive or negative, relative to the reference potential of bus 122. Each of switches 132, 134 and 136 is illustrated as being closed and plasma discharges associated therewith are illustrated as being in various stages of propagation toward projectile 121. Switches 132, 134 and 136 are closed in response to position sensing devices, similar to those described in connection with FIG. 3. In the embodiment of FIG. 7, however, closure of one switch results in a plasma discharge being established between two pairs of electrodes, whereby closure of switch 132 results in plasma discharges being established between electrodes 123 and 124 as well as between electrodes 124 and 125. In the embodiment illustrated in FIG. 7, there is an additional high voltage power supply 131, having one terminal connected to bus 122 and a second terminal connected to open circuited switch 137. Switch 137 is in an open state because projectile 121 has not moved far enough along the accelerator to be sensed by a stage which would cause closure of switch 137. Thereby, no plasma discharge has been initiated between anode 138, connected to switch 137 and cathodes 129, and 139, on either side of and immediately adjacent anode 138.

In both embodiments of FIGS. 3 and 7, logic circuitry (not shown) is responsive to the positional sensors to activate the various switches connected between the high voltage power supplies and the electrodes. The logic circuitry responds to the position of the projectile, to calculate the projectile velocity in the accelerator, at each individual module along the accelerator length. In response to the calculated velocity, the time at which the various switches are to be closed is calculated and an actuator is controlled at an appropriate time to provide the switch closure. In the alternative, the velocity of the projectile at predetermined positions along the length of the accelerator can be approximated to a relatively accurate extent so that a delay factor is associated with each sensor and a switch which is to be closed in response to the sensor detecting passage of the projectile.

While there has been described and illustrated one specific embodiment of the invention, it will be clear that variations in the details of the embodiment specifically illustrated and described may be made without departing from the true spirit of the invention as defined in the appended claims.

What is claimed is:

1. A method of accelerating a solid mass along a predetermined path, said mass having an axis initially positioned at a point on the path and a peripheral cross sectional surface region surrounding, but not intersecting the axis, the axis moving along the path during acceleration, comprising the steps of imploding a plasma discharge toward the path in response to current flowing in the plasma, the plasma arriving on the region of the surface to impart force components to the mass along and normal to the path and accelerate the mass along the path, and synchronizing the imploding of the plasma with the acceleration of the mass along the path so the arrival of the plasma on the region is matched with movement of the projectile along the path.

2. The method of claim 1 wherein the plasma arrives at the region on opposite sides of the surface with substantially equal forces so the normal components are balanced and the mass is accelerated by the components along the axis.

3. The method of claim 1 wherein the imploding plasma has substantial velocity components radially toward the path and insubstantial velocity components in the direction of the path.

4. The method of claim 2 wherein the region is a surface of revolution about the axis and the plasma has a circular inner imploding periphery at right angles to the axis when it arrives at the region.

5. The method of claim 2 or claim 3 or claim 3 wherein the region is tapered toward the axis in a direction opposite from the direction of acceleration and the plasma implodes toward the path.

6. The method of claim 1 wherein the region is tapered toward the axis in a direction opposite from the direction of acceleration and the plasma implodes toward the path.

7. The method of claim 2 or claim 4 or claim 3 or claim 6 wherein the plasma is synchronized by initiating separate plasma discharges at spaced regions along the path.

8. The method of claim 1 wherein the plasma is synchronized by initiating separate plasma discharges at spaced regions along the path.

9. The method of claim 1 or claim 2 or claim 4 or claim 6 or claim 8 or claim 3 wherein the plasma induces an ionized liquid layer in abuttment with the region, a magnetic field from the plasma interacting with the ionized liquid layer to accelerate the mass along the path.

10. The method of claim 1 or claim 2 or claim 4 or claim 6 or claim 8 wherein a magnetic field from the plasma compresses the plasma against the region to impart momentum and pressure to the region and accelerate the mass along the path.

11. The method of claim 1 or claim 2 or claim 4 or claim 6 or claim 8 or claim 3 wherein the plasma interacts with the region to ablate material from the region in a direction generally normal to the region to impart force to the mass generally in the direction of the axis and the acceleration direction to accelerate the mass along the path.

12. The method of claim 1 or claim 2 or claim 4 or claim 6 or claim 8 or claim 3 wherein a magnetic field from the plasma compresses the plasma against the region to impart momentum and pressure to the region and assist in accelerating the mass along the path and wherein the plasma induces an ionized liquid layer in abuttment with the region, the magnetic field interacting with the ionized layer to further assist in accelerating the mass along the path.

13. The method of claim 1 or claim 2 or claim 4 or claim 6 or claim 8 or claim 3 wherein a magnetic field from the plasma compresses the plasma against the region to impart momentum and pressure to the region and assist in accelerating the mass along the path and wherein the plasma interacts with the region to ablate material from the region in a direction normal to the region to impart a force to the mass generally in the direction of the axis and the acceleration direction to further assist in accelerating the mass along the path.

14. The method of claim 1 or claim 2 or claim 4 or claim 6 or claim 8 or claim 3 wherein a magnetic field from the plasma compresses the plasma against the region to impart momentum and pressure to the region to assist in accelerating the mass along the path and wherein the plasma interacts with the region to ablate material from the region in a direction generally normal to the region to impart a force to the mass generally in the direction of the axis and the acceleration direction to further assist in accelerating the mass along the path.

15. The method of claim 1 or claim 2 or claim 4 or claim 6 or claim 8 or claim 3 wherein a magnetic field from the plasma compresses the plasma against the region to impart momentum and pressure to the region to assist in accelerating the mass along the path and wherein the plasma interacts with the region to ablate material from the region in a direction generally normal to the region to impart a force to the mass generally in the direction of the axis and the acceleration direction to further assist in accelerating the mass along the path and wherein the plasma compresses against the region to impart momentum and pressure to the region to further assist in accelerating the mass along the path.

16. The method of claim 1 or claim 2 or claim 4 or claim 6 or claim 8 or claim 3 wherein the plasma implosion is initiated by applying a discharge voltage through a gas in a region spaced radially from and surrounding the path, the discharge voltage inducing a current flow in the gas which continues as the current flow in the plasma that produces the magnetic field, said magnetic field and plasma being initiated to surround the path to cause the plasma to implode toward the path from all radial directions and to arrive on the region of the mass from all radial directions.

17. The method of claim 1 or claim 2 or claim 4 or claim 6 or claim 8 or claim 3 wherein the plasma implosion is initiated by applying a discharge voltage through a gas in a region spaced radially from the path, the discharge voltage inducing a current flow in the gas which continues as the current flow in the plasma that produces the magnetic field.

18. The method of claim 1 further comprising injecting the mass along the path so it has a non-zero velocity when it initially encounters the force components.

19. Apparatus for accelerating a solid mass along a predetermined path, said mass having an axis initially positioned at a point on the path and a peripheral cross sectional surface region surrounding but not intersecting the axis, the axis moving along the path during acceleration, comprising means for imploding a plasma discharge inwardly toward the path, the plasma being imploded so it arrives on the region of the surface to impart force components to the mass along and normal to the path and accelerate the mass along the path, and means for synchronizing the imploding of the plasma discharge with the acceleration of the mass along the path so the arrival of the plasma on the region is matched with movement of the projectile along the path.

20. The apparatus of claim 19 wherein the means for synchronizing includes means for sensing the movement of the accelerating mass along the path.

21. The apparatus of claim 20 wherein the imploding means includes a plurality of cascaded accelerating sections along the length of the path, each of said sections including spaced anode and cathode electrodes along the path direction, and the synchronizing means includes means responsive to the sensing means for initiating successive high voltage electric discharges between the electrodes of the successive sections.

22. The apparatus of claim 19 or 20 wherein the region is formed as a surface of revolution about the axis, and the means for imploding includes means for shaping the imploding plasma so it has a circular inner imploding periphery at right angles to the axis when it arrives at the region.

23. The apparatus of claim 19 wherein the imploding plasma has substantial velocity components radially toward the path and insubstantial velocity components in the direction of the path.

24. The apparatus of claim 19 wherein the imploding means includes an envelope containing a gas as well as anode and cathode electrodes longitudinally spaced along and remote from the path, a solid dielectric remote from and surrounding the path extending between the electrodes and a high voltage source connected to said electrodes, said electrodes and the dielectric being shaped and the voltage applied by the source to the electrodes being such that the plasma discharge is initiated in the gas proximate the surface of the dielectric and surrounding the path and current in the plasma produces a magnetic field surrounding the path, the field imploding the plasma radially inwardly to collect the gas and convert the collected gas into a plasma annulus that moves toward the axis in response to activation of the source.

25. The apparatus of claim 24 wherein a plurality of said anode and cathode electrodes are in cascaded sections along the path, and the synchronizing means includes means for successively applying voltages from the source to the electrodes of the cascaded sections.

26. The apparatus of claim 24 or claim 27 or claim 23 wherein the solid dielectric is a ring coaxial with the path and the electrodes are annular plates coaxial with and at right angles to the path, the plates having an inner diameter substantially less than the inner diameter of the ring, whereby the plates and ring intersect so the plasma is initiated in a gas at the surface of the ring between the electrodes in response to a high voltage pulse from the source and current continues to flow in the gas to establish a magnetic field that implodes the plasma toward the path.

27. The apparatus of claim 24 or claim 25 or claim 23 wherein the solid dielectric is a ring coaxial with the path and the electrodes have a circular periphery coaxial with the path, the minimum diameter of the ring and electrodes being approximately the same.

28. The apparatus of claim 25 wherein the means for synchronizing includes means for sensing the movement of the accelerating mass along the path, and means responsive to the sensing means for activating the means for successively applying the pulses to the cascaded sections.

29. The apparatus of claim 24 or claim 25 or claim 23 wherein the envelope has an exit end through which the mass passes into an environment exterior to the device and means for establishing a pressure differential across the exit end between the environment and the envelope.

30. The apparatus of claim 19 wherein the imploding means is located in an envelope having an exit end through which the mass passes into an environment exterior to the device and means for establishing a pressure differential across the exit end between the environment and the envelope.

31. The apparatus of claim 19 further including means for injecting the mass along the path into the imploding means with an axial non-zero velocity.

32. In combination, a projectile having a longitudinal axis and a region formed as a surface of revolution about the axis, said region being tapered toward the axis, apparatus for accelerating the projectile along a predetermined path so that the projectile axis moves along the path, the projectile being positioned so the tapered region is directed oppositely from the direction of movement, said apparatus comprising means for imploding a plasma discharge inwardly toward the path, the plasma being imploded so it arrives on the region to impart force components to the projectile along and normal to the path so as to accelerate the projectile along the path, and means for synchronizing the imploding of the plasma discharge with the acceleration of the projectile along the path so the arrival of the plasma on the region is matched with the movement of the projectile along the path.

33. The combination of claim 32 wherein the force components have a center of action against the region and the projectile has a center of mass behind the center of action.

34. The combination of claim 33 wherein the projectile includes nose and tail sections and has a nonuniform density with a greater density toward the tail section than toward the nose section.

35. The combination of claim 33 wherein the projectile region is conical.

36. The combination of claim 33 wherein the projectile region has a greater curvature in proximity to the nose section than in proximity to the tail section.

37. The combination of claim 36 wherein the tail section is elongated and has a slight curvature to stabilize the projectile movement along the path despite the tendency of kink instability of the plasma pinching behind a main tapered portion of the projectile.

38. The combination of claim 32 wherein the imploding means is located in an evacuated envelope having an exit end through which the projectile passes into the atmosphere, and means for establishing a pressure differential across the exit end between the atmosphere and evacuated envelope.

39. The combination of claim 32 further including means for injecting the projectile along the path into the imploding means with an initial non-zero velocity.

40. The combination of claim 32 wherein the imploding plasma has substantial velocity components radially toward the path and insubstantial velocity components in the direction of the path.

41. A projectile adapted to be accelerated along a longitudinal axis thereof by an apparatus that accelerates the projectile along a predetermined path, the apparatus imploding a fluid toward the path so the fluid arrives on a region of the projectile surface to impart force components to the projectile along and normal to the path, the projectile comprising a peripheral tapered surface of revolution being the region, the tapered surface forming directed oppositely from the direction of movement along the path, the taper and the mass within the projectile being arranged so the projectile has a center of mass behind a center of action of the force components along the path against the region.

42. The combination of claim 33, 34, 35, 36, 37, 38 or 39 wherein the imploding plasma has substantial velocity components radially toward the path and insubstantial velocity components in the direction of the path.

43. The projectile of claim 41 wherein the projectile includes nose and tail sections and has a non-uniform density with a greater density toward the tail section than toward the nost section.

44. The projectile of claim 43 wherein the projectile region is conical.

45. The projectile of claim 43 wherein the projectile region has a greater curvature in proximity to the nose section than in proximity to the tail section.

46. The projectile of claim 45 wherein the tail section is elongated and has a slight curvature to stabilize the projectile movement along the path despite the tendency of kink instability of the fluid pinching behind a main tapered portion of the projectile.

47. The projectile of claim 41 or claim 43 or claim 44 or claim 45 or claim 46 wherein the fluid is a plasma discharge and the projectile is fabricated of a dielectric so currents are not induced therein by the plasma discharge.

48. The projectile of claim 40 or claim 41 or claim 44 or claim 45 or claim 46 wherein the fluid is a plasma discharge, the magnetic fields associated with the imploding plasma and adjacent the projectile are relatively weak, and the projectile is fabricated of metal.

49. A method of accelerating a solid mass along a flight path comprising the steps of accelerating the mass while in free flight along the path by imploding a plasma discharge radially toward the path in response to current flowing in an azimuthal magnetic field flux coaxial with the axis to establish the plasma generally parallel to the flight path axis.

50. The method of claim 49 wherein the plasma discharge is timed such that the plasma contacts the mass to impart force components to the mass along and normal to the path.

51. The method of claim 49 or 50 wherein the plasma is imploded to have a radial taper toward the path such that at time t the imploded plasma at radius $R_1$ is at path position $P_1$ and the imploded plasma at radius $R_2$ is at path position $P_2$, where $R_1$ is less than $R_2$ and $P_1$ is traversed by the projectile prior to $P_2$, and $P_1$ and $P_2$ are selectively different positions of the plasma discharge along the path length.

52. The method of claim 50 wherein the plasma arrives at the region on opposite sides of the mass with substantially equal forces so the normal components are balanced and the mass is accelerated by the components along the path.

53. The method of claim 52 wherein the imploding plasma has substantial velocity components radially toward the path and insubstantial velocity components in the direction of the path.

54. The method of claim 50 further including synchronizing the imploding of the plasma with the acceleration of the mass along the path so the arrival of the plasma on the mass is matched with movement of the mass along the path.

55. The method of claim 52 further including synchronizing the imploding of the plasma with the acceleration of the mass along the path so the arrival of the plasma on the mass is matched with movement of the mass along the path.

56. The method of claim 54, 55 or 53 wherein the plasma is synchronized by initiating separate plasma discharges at spaced regions along the path.

57. The method of claim 50, 52, 54 or 53 wherein the plasma induces an ionized liquid layer in abuttment with an exterior surface of the mass, a magnetic field from the plasma interacting with the ionized liquid layer to accelerate the mass along the path.

58. The method of claim 50, 52, 54 or 53 wherein a magnetic field plasma compresses the plasma against an exterior surface of the mass to impart momentum and pressure to the surface and accelerate the mass along the path.

59. The method of claim 50, 52, 54 or 53 wherein the plasma interacts with an exterior surface of the mass to ablate material from the surface in a direction generally normal to the region to impart force to the mass generally in the direction of the path and the acceleration direction to accelerate the mass along the path.

60. The method of claim 50, 52, 54 or 53 wherein a magnetic field from the plasma compresses the plasma against an exterior surface of the mass to impart momentum and pressure to the surface and assist in accelerating the mass along the path and wherein the plasma induces an ionized liquid layer in abuttment with the surface, the magnetic field interacting with the ionized layer to further assist in accelerating the mass along the path.

61. The method of claim 50, 52, 54 or 53 wherein a magnetic field resulting from the current flowing in the plasma compresses the plasma against an exterior surface of the mass to impart momentum and pressure to the surface and assist in accelerating the mass along the path and wherein the plasma interacts with the surface to ablate material from the surface in a direction normal to the region to impart a force to the mass generally in the direction of the path and the acceleration direction to further assist in accelerating the mass along the path.

62. The method of claim 50, 52, 54 or 53 wherein a magnetic field resulting from the current flowing in the plasma compresses the plasma against an exterior surface of the mass to impart momentum and pressure to the surface to assist in accelerating the mass along the path and wherein the plasma interacts with the surface to ablate material from the surface in a direction generally normal to the surface to impart a force to the mass generally in the direction of the path and the acceleration direction to further assist in accelerating the mass along the path.

63. The method of claim 50, 52, 54 or 53 wherein a magnetic field resulting from the current flowing in the plasma compresses the plasma against an exterior surface of the mass to impart momentum and pressure to the surface to assist in accelerating the mass along the path and wherein the plasma interacts with the surface to ablate material from the surface in a direction generally normal to the surface to impart a force to the mass generally in the direction of the path and the acceleration direction to further assist in accelerating the mass along the path and wherein the plasma compresses against the surface to impart momentum and pressure to the surface to further assist in accelerating the mass along the path.

64. The method of claim 50, 52 or 54 wherein the plasma implosion is initiated by applying a discharge voltage through a gas in a region spaced radially from and surrounding the path, the discharge voltage inducing a current flow in the gas which continues as the current flow in the plasma that produces the magnetic field, said magnetic field and plasma being initiated to surround the path to cause the plasma to implode toward the path from all radial directions and to arrive on the mass from all radial directions.

65. The method of claim 50, 52 or 54 wherein the plasma implosion is initiated by applying a discharge voltage through a gas in a region spaced radially from the path, the discharge voltage inducing a current flow in the gas which continues as the current flow in the plasma that produces the magnetic field.

66. The method of claim 1, 2, 4, 6, 8, 18, 52, 54, 55, 49 or 50 wherein the imploding plasma has substantial velocity components radially toward the path and insubstantial velocity components in the direction of the path.

67. Apparatus for accelerating a solid mass in free flight along a flight path comprising means for establishing a plasma discharge along the path, means for imploding the plasma discharge radially toward the path, said means for imploding including means for establishing a current flow in the plasma generally parallel to the flight path axis to establish azimuthal magnetic field flux coaxial with the axis so the plasma is imploded toward the path to accelerate the mass in free flight along the path.

68. The apparatus of claim 67 wherein the imploding means is located in an envelope having an exit end through which the mass passes into an environment exterior to the device and means for establishing a pressure differential across the exit end between the environment and the envelope.

69. The apparatus of claim 67 whereifn the imploding plasma has substantial velocity components radially toward the path and insubstantial velocity components in the direction of the path.

70. The apparatus of claim 67 wherein the current flow implodes the plasma to impart force components to the mass along and normal to the path.

71. The apparatus of claim 67 wherein the plasma imploding means includes means for imploding the plasma such that at time t the imploded plasma at radius $R_1$ is at path position $P_1$ and the imploded plasma at radius $R_2$ is at path position $P_2$, where $R_1$ is less than $R_2$ and $P_1$ is traversed by the projectile prior to $P_2$, and $P_1$ and $P_2$ are selectively different positions of the plasma discharge along the path length.

72. The apparatus of claim 67 or 71 wherein the imploding means includes an envelope containing a gas as well as anode and cathode electrodes longitudinally spaced along and remote from the path, a solid dielectric remote from and surrounding the path extending between the electrodes and a high voltage source connected to said electrodes, said electrodes and the dielectric being shaped and the voltage applied by the source to the electrodes being such that the plasma discharge is initiated in the gas proximate the surface of the dielectric and surrounding the path and current in the plasma produces a magnetic field surrounding the path, the field imploding the plasma radially inwardly to collect the gas and convert the collected gas into a plasma annulus that moves toward the axis in response to activation of the source.

73. The apparatus of claim 67 further including means for synchronizing the imploding of the plasma discharge with the acceleration of the mass along the path so the arrival of the plasma on the mass is matched with movement of the projectile along the path.

74. The apparatus of claim 73 wherein the means for synchronizing includes means for sensing the movement of the accelerating mass along the path.

75. The apparatus of claim 74 wherein the imploding means includes a plurality of cascaded accelerating sections along the length of the path, each of said sections including spaced anode and cathode electrodes along the path direction, and the synchronizing means includes means responsive to the sensing means for initiating successive high voltage electric discharges between the electrodes of the successive sections.

76. The apparatus of claim 72 wherein a plurality of said anode and cathode electrodes are in cascaded sections along the path, and the synchronizing means includes means for successively applying voltages from the source to the electrodes of the cascaded sections.

77. The apparatus of claim 72, 76 or 69 wherein the solid dielectric is a ring coaxial with the path and the electrodes are annular plates coaxial with and at right angles to the path, the plates having an inner diameter substantially less than the inner diameter of the ring, whereby the plates and ring intersect so the plasma is initiated in a gas at the surface of the ring between the electrodes in response to a high voltage pulse from the source and current continues to flow in the gas to establish a magnetic field that implodes the plasma toward the path.

78. The apparatus of claim 72, 76 or 69 wherein the solid dielectric is a ring coaxial with the path and the electrodes have a circular periphery coaxial with the path, the minimum diameter of the ring and electrodes being approximately the same.

79. The apparatus of claim 76 wherein the means for synchronizing includes means for sensing the movement of the accelerating mass along the path, the means responsive to the sensing means for activating the means for successively applying the pulses to the cascaded sections.

80. The apparatus of claim 72, 76 and 69 wherein the envelope has an exit end through which the mass passes into an environment exterior to the device and means for establishing a pressure differential across the exit end between the environment and the envelope.

81. The apparatus of claim 20, 24, 25, 28, 30, 72, 73, 74, 75, 76, 79 or 68 wherein the imploding plasma has substantial velocity components radially toward the path and insubstantial velocity components in the direction of the path.

82. The apparatus of claim 72, 73, 74, 75, 76, 79 or 68 wherein the imploding plasma has substantial velocity components radially toward the path and insubstantial velocity components in the direction of the path.

83. The combination of claim 32 or claim 33 or claim 34 or claim 35 or claim 36 or claim 37 or claim 69 wherein the projectile is fabricated of a low electrical conductivity material so substantial eddy currents are not induced therein by the plasma discharge.

84. The combination of claim 32 or claim 33 or claim 34 or claim 35 or claim 36 or claim 37 or claim 69 wherein the magnetic fields associated with the imploding plasma, when the plasma is adjacent the projectile are relatively weak, and the projectile is fabricated of a material having a high electric conductivity.

* * * * *